US008078000B2

(12) United States Patent
Böhm et al.

(10) Patent No.: US 8,078,000 B2
(45) Date of Patent: Dec. 13, 2011

(54) METHOD FOR THE IMPROVED DISPLAY OF CO-REGISTERED 2D-3D IMAGES IN MEDICAL IMAGING

(75) Inventors: Stefan Böhm, Oberasbach (DE); Klaus Finkler, Spardorf (DE); Marcus Pfister, Bubenreuth (DE); Johann Seissl, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 996 days.

(21) Appl. No.: 11/492,432

(22) Filed: Jul. 25, 2006

(65) Prior Publication Data

US 2007/0025605 A1 Feb. 1, 2007

(30) Foreign Application Priority Data

Jul. 28, 2005 (DE) .......................... 10 2005 035 430

(51) Int. Cl.
*G06K 9/40* (2006.01)
*G06K 9/00* (2006.01)
(52) U.S. Cl. ........................................ 382/274; 382/100
(58) Field of Classification Search .................. None
See application file for complete search history.

(56) References Cited

U.S. PATENT DOCUMENTS

| 5,333,256 | A | * | 7/1994 | Green et al. | ................... | 715/772 |
| 5,590,271 | A | * | 12/1996 | Klinker | ........................ | 715/763 |
| 5,672,877 | A | * | 9/1997 | Liebig et al. | ............. | 250/363.04 |
| 6,019,724 | A | * | 2/2000 | Gronningsaeter et al. | ..... | 600/439 |
| 6,792,399 | B1 | * | 9/2004 | Phillips et al. | ............... | 705/36 R |
| 7,072,863 | B1 | * | 7/2006 | Phillips et al. | ............... | 705/36 R |
| 7,246,014 | B2 | * | 7/2007 | Forth et al. | ........................ | 702/60 |
| 7,401,286 | B1 | * | 7/2008 | Hendricks et al. | ............. | 715/203 |
| 2003/0063787 | A1 | * | 4/2003 | Natanzon et al. | ............. | 382/131 |
| 2003/0142141 | A1 | * | 7/2003 | Brown et al. | .................. | 345/805 |
| 2004/0013290 | A1 | * | 1/2004 | Krishnan et al. | ............... | 382/128 |
| 2004/0022736 | A1 | * | 2/2004 | Poduslo et al. | ............ | 424/9.341 |
| 2004/0027383 | A1 | * | 2/2004 | Jaeger | ............................ | 345/769 |
| 2004/0168133 | A1 | * | 8/2004 | Wynn et al. | .................... | 715/541 |
| 2004/0201765 | A1 | * | 10/2004 | Gammenthaler | ........ | 348/333.01 |
| 2005/0004449 | A1 | * | 1/2005 | Mitschke et al. | ............. | 600/424 |

(Continued)

FOREIGN PATENT DOCUMENTS

WO 0134051 A2 5/2001

OTHER PUBLICATIONS

Gobbi et al., "Ultrasound/MRI Overlay with Image Warping for Neurosurgery", Lecture Notes in Computer Science, 2000, pp. 106-114, vol. 1935, Proceedings of the Third International Conference on Medical Image Computing and Computer-Assisted Intervention, ISBN: 3-540-41189-5.

*Primary Examiner* — Jingge Wu
*Assistant Examiner* — Avinash J Yentrapati

(57) ABSTRACT

The present invention relates to a method, which assists a doctor for instance in orientation in 2D fluoroscopy images. The present invention relates here to a method for displaying co-registered 2D-3D images in medical imaging, comprising the following steps: determine a 3D or 2D projection which is congruent with a 2D image from a 3D image data set, and overlaid display of the 2D image with the 3D or 2D projection on a monitor, characterized in that the two image parts of the two overlaid images can be adjusted and a shift in the two overlaid images which can be adjusted in at least one direction is enabled.

11 Claims, 2 Drawing Sheets

U.S. PATENT DOCUMENTS

| | | | |
|---|---|---|---|
| 2005/0027187 A1* | 2/2005 | Barth et al. | 600/407 |
| 2005/0027729 A1* | 2/2005 | Kuchinsky et al. | 707/100 |
| 2005/0054924 A1* | 3/2005 | Dione et al. | 600/437 |
| 2005/0212969 A1* | 9/2005 | Chen | 348/569 |
| 2006/0078183 A1* | 4/2006 | deCharms | 382/128 |
| 2007/0024935 A1* | 2/2007 | Yamamoto | 358/537 |
| 2007/0025605 A1* | 2/2007 | Bohm et al. | 382/128 |
| 2007/0035775 A1* | 2/2007 | Asai | 358/3.28 |

* cited by examiner

METHOD FOR THE IMPROVED DISPLAY OF CO-REGISTERED 2D-3D IMAGES IN MEDICAL IMAGING

CROSS REFERENCE TO RELATED APPLICATIONS

This application claims priority of German application No. 10 2005 035 430.0 filed Jul. 28, 2005, which is incorporated by reference herein in its entirety.

FIELD OF THE INVENTION

The present invention relates to a method, which assists a doctor in orientation in 2D fluoroscopy images for instance. The present invention relates here to a method, which combines the advantages of current visualization methods particularly when overlaying registered 3D volumes during interventions using x-ray control, but prevents its disadvantages.

BACKGROUND OF THE INVENTION

Examinations or treatments of an (ill) patient are increasingly carried out in a minimally invasive manner, i.e. with as little operative effort as possible. Examples of such procedures are treatments using instruments such as endoscopes, laparoscopes, catheters or biopsy needles, which are inserted into the examination area of the patient, via a small opening in the body in each instance. By way of example, catheters are frequently used within the scope of angiographic or cardiological examinations.

To navigate these instruments (e.g. in the head or the heart), so-called intraoperative 2D images (real-time images) are obtained during the intervention on the basis of fluoroscopic or angiographic fluoroscopy (e.g. with the C-arm). Such an angiography is shown for instance in FIG. 1.

The problem from a medical-technology perspective lies in these fluoroscopy images indicating no spatial (three-dimensional) details compared with 3D angio images.

However, these fluoroscopy images are available quickly and minimize the radiation exposure for patient and doctor.

In the prior art, the spatial information is hereby regained in that preoperatively recorded 3D images (for instance from a CT tomography, 3D angio tomography or an MR tomography) are registered with the two-dimensional intraoperative fluoroscopy images and are underlaid with said images, which is referred to as co-registration.

A co-registration method of medical images of different imaging modalities is disclosed in U.S. Pat. No. 5,672,877 for instance. An emission image (e.g. a SPECT image, acronym for "Single-Photon Emission Computed Tomography") recorded using a nuclear-medical imaging system) is acquired, which is registered with a transmission image (e.g. a CT image, recorded with the same or another imaging system) so as to display functional structures and anatomical structures similarly in a single image, overlaid for instance.

U.S. Pat. No. 6,019,724 A discloses a method, in which intraoperative 2D and/or 3D (ultrasound images), which map the respective current position of the used surgical instrument, are overlaid on the preoperative images of other imaging modalities (MR, CT, C-arm etc.) in order to assist the surgeon in guiding the instrument.

The combination of such co-registered 2D and 3D images now allows the doctor a better orientation in the relevant volume range.

Such 2D-3D co-registration according to the prior art comprises two steps:
1. the image registration itself and
2. the visualization.

With image registration, it must first be determined from which direction a 3D volume must be projected so that it can be made congruent with the intraoperative 2D image and a suitable second 2D image must be generated from the 3D image data set, said second 2D image being able to be made congruent with the first intraoperative 2D image. This second 2D image is either generated by projecting the 3D image data set or by a clip plane, which is placed through the 3D image data set. This must determine from which direction the projection has to be carried out and/or how the clip plane must be placed. Different approaches exist for this, which are however not carried out.

Two standard methods exist inter alia for the visualization of the registered images, in other words the common display of the first 2D image and 3D projection and/or second 2D image or clip plane:
1. overlay and
2. linked cursor.

With the "overlay", the two images are placed one over the other (with the aid of different methods). The part which each of the two individual images on the overlaid (merged) image is to exhibit can be adjusted and is referred to as "blending".

US 2004/0013290 A1 discloses a method, which solves the problem of overlaying several (preferably two) 2D and/or 3D images of different imaging modalities, with the aim of merging several different diagnostically relevant structures/information into one single image and making their cohesions visible. The overlay of 2D or 3D outputs of CT or PET imaging modalities is thus kept in mind for instance. Besides other technologies, the overlaid images are also merged by means of "blending technologies".

With the "linked cursor", both images are displayed in separate (pop-up) windows and where possible even on separate monitors, with both windows having a common cursor.

Movements in the 2D window are now transferred into the 3D window and vice versa.

The overlay displays the most current method, but is however disadvantageous in that certain low-contrast objects in the 2D image (e.g. catheter tips, stents etc.) can be covered by the high contrast 3D recordings under some circumstances when overlaying and/or cross fading.

This problem does not exist with the linked cursor. The linked cursor is however disadvantageous in its being directed onto two windows (two monitors). Particularly in the operating theatre, only one pop up window is wanted on only one monitor and with the largest possible display.

SUMMARY OF THE INVENTION

The object of the present invention is to further improve the visualization of co-registered 2D-3D images.

This object is achieved in accordance with the invention by the features of the independent claims. The dependent claims advantageously further develop the central concept behind the invention.

In accordance with the invention, a method is claimed to display co-registered 2D-3D images in medical imaging, comprising the following steps:
S1: Determining a 3D or 2D projection congruent with a 2D image from a 3D image data set,
S2: Overlaid display of the 2D image with the 3D or 2D projection onto a monitor, characterized in that the two image parts of the two overlaid images can be adjusted and a shift in the two overlaid images which can be adjusted at least in one direction is enabled, with one identical position being marked in each instance in the two potentially shifted images and with the marked position(s) being able to be selected as a function of the user.

In accordance with the invention, with this procedure at least one of the potential adjustments is carried out by means of a manual input device, e.g. a joystick.

The adjustable shift is advantageously enabled in two directions orthogonal to one another, e.g. x-y direction.

In an advantageous embodiment of the invention, the 2D image is intraoperatively obtained, with the 2D image advantageously being a 2D fluoroscopy image.

In accordance with the invention, the 3D image is preoperatively obtained and advantageously displays a CT image, a 3D angio image or an MRT image.

Furthermore, a device for implementing a method according to one of the preceding claims is claimed.

BRIEF DESCRIPTION OF THE DRAWINGS

Further advantages, features and characteristics are now explained in more detail below with reference to exemplary embodiments referring to the attached drawings, in which:

FIGS. 1 and 2 is characterized

DETAILED DESCRIPTION OF THE INVENTION

Figure 2:
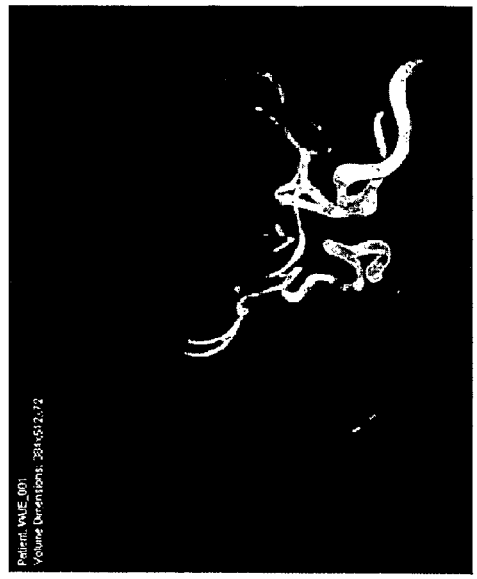
FIG. 2 shows a segmented vascular tree in a 3D display.
Figure 1:
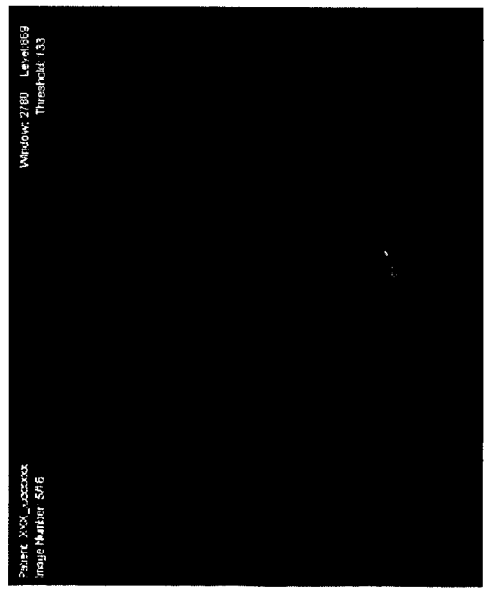
FIG. 1 shows a vascular structure in the form of a 2D road map.

The method according to the invention consists in improving the visualization step, as is explained on the basis of FIGS. 1 to 8. FIG. 1 shows a fluoroscopy image of a vascular structure in the form of a 2D roadmap. FIG. 2 shows a 3D display of a segmented vascular tree, which contains the vascular structure from FIG. 1 and is congruent therewith.

According to the present invention, the two co-registered (2D and 3D) images are overlaid together in a (pop-up) window as with an overlay, and namely in the form of an adjustable cross fading.

Figure 4:
FIG. 4 shows an overlay of FIGS. 1 and 2, in which the fine structure of the catheter tip is overlaid by the high contrast 3D image of FIG. 2.
Figure 3:
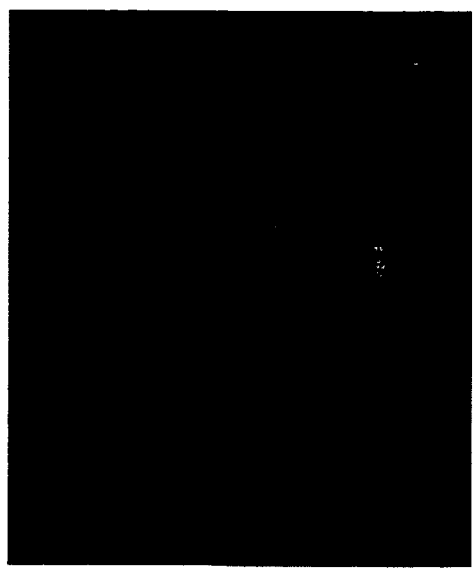
FIG. 3 shows an overlay of FIGS. 1 and 2 in which the fine structure of a catheter tip is still visible.

FIG. 3 shows this overlay of the 2D image from FIG. 1 with the 3D image from FIG. 2 by means of "blending", in which the 3D image is copied in the adjustable transparency stages over the 2D image. The adjustment is carried out by means of a manual input device, with a joystick for instance, and is thus necessary, as a fine structure (for instance a catheter tip) which can still be recognized to some degree in FIG. 3, is covered by the high contrast 3D image in the event of more significant cross-fading (FIG. 4).

In accordance with the invention, a similarly adjustable lateral shift is additionally permitted in at least one direction, advantageously however in two directions orthogonal to one another (x-y direction: horizontal-vertical), in order to be able to prevent covering low-contrast structures. To be able to make the extent of the shift visible, a linked cursor (in FIGS. 5 to 8 in the form of an arrow) is additionally implemented in both images, which points towards the respective same position in both images (however in the same window).

Figure 5:
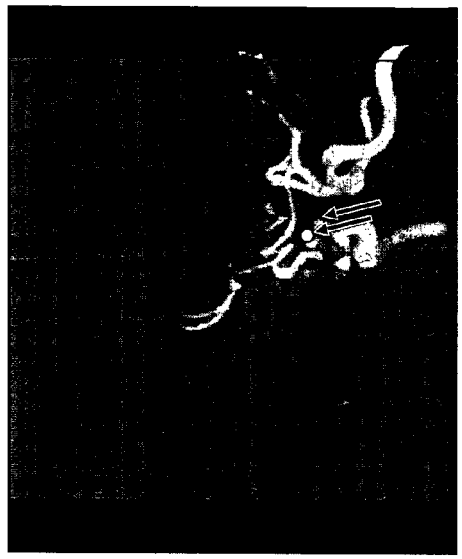
FIG. 5 shows an unshifted overlay of FIGS. 1 and 2, in which the same point of the vascular anatomy of both
Figure 6:
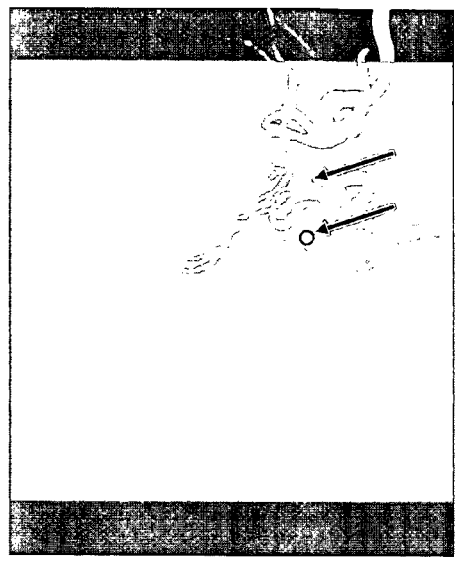
FIG. 6 shows a horizontal weak shifted overlay of FIGS. 1 and 2 with markers of the same anatomical point.

In FIG. 5, the 2D roadmap overlays the still unshifted 3D image. The catheter tip is marked by a cursor arrow. By implementing the linked cursor functionality, two simultaneously moved cursors exist with a shifted blending (FIG. 6), said cursors pointing in each instance to the same anatomical position in the 2D and in the 3D part of the images.

Figure 7:
FIG. 7 shows a horizontal strong shifted overlay of FIGS. 1 and 2 with markers of the same anatomical point.
Figure 8:
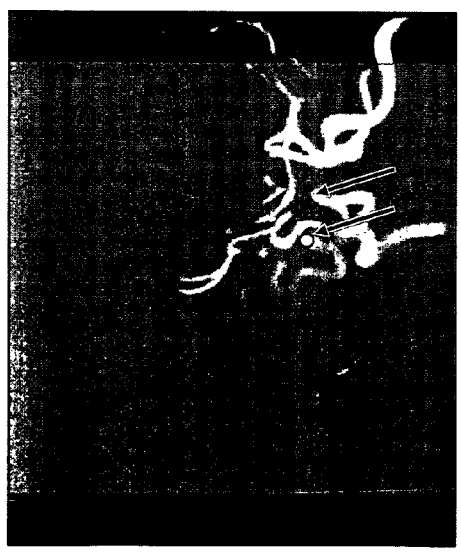
FIG. 8 shows a horizontal strong shifted overlay of FIGS. 1 and 2 with markers of the same anatomical point.

The greater the shift, the greater the distances between the cursors and the better the two images can be differentiated. In FIGS. 7 and 8, the catheter tip is now hardly covered any more by a high contrast (underlaid) image by means of significant horizontal shift.

The function of the shift can be implemented and controlled in a simple manner with the aid of a joystick, which is ultimately also easy to operate in an operating theatre (OP).

In summary, the invention consists in proposing a combined representation of co-registered images, which combine the advantages of the current conventional visualizations, prevents its disadvantages however and allows the respective parameters thereof (blending and shift) to be easily controlled in the OP by a joystick.

The invention claimed is:

1. A method for improving a 3D visualization of both a vascular insert and a vessel anatomy surrounding the insert in a patient using a radiography during a medical intervention procedure, comprising:

determining a 2D projection to obtain a first 2D image from a 3D image data set, which includes a view of at least said vessel anatomy of the patient, and which is obtained with a first imaging device prior to the medical intervention procedure, said 2D image containing a view of the vessel anatomy and congruent with a second 2D image obtained with a second imaging device during the intervention procedure, said second 2D image containing a view of the insert and the vessel anatomy surrounding the insert, wherein the view of the insert in the second 2D image has a first-contrast value, wherein a view of the first 2D image has a second-contrast value, wherein the second-contrast value is sufficiently high relative to the first-contrast value to cover the view of the insert when the first and second 2D images are overlaid;

overlaying the second 2D image with the first 2D image on a single window display on a monitor, adjusting a cross fading of at least two image parts of the overlaid images, wherein at least one of said at least two image parts contains the view of the insert and the vessel anatomy surrounding the insert, wherein at least another one of said at least two image parts is transparent relative to said at least one of said at least two image parts;

manually adjusting a transparency stage of at least one of the overlaid images to provide a blended view of the vessel anatomy surrounding the insert but covering the view of the insert due to the second contrast value of the second 2D image being sufficiently high relative to the first contrast value of the insert in the first 2D image;

generating respective cursors linked to said at least two image parts;

simultaneously displaying the respective linked cursors on said single window display;

spatially shifting within said single window display in response to commands from a user at least one of the two image parts of the overlaid images on said single window display along a first axial direction;

arranging the spatial shifting of said at least one of the two image parts of the overlaid images on said single window display to cause a sufficient spatial separation between said at least one of said at least two image parts containing the view of the insert, and said at least another one of said at least two image parts covering the view of the insert so that the view of the insert is no longer covered, said at least two image parts providing respective views of the vessel anatomy surrounding the insert; and using relative movement of the respective cursors displayed on said single window display as a visual cue to the user for performing said spatial shifting, wherein the respective cursors displayed on said single window display are configured to point to an identical position marked in both the shifted and unshifted images and wherein the marked identical position is selected by the user.

2. The method as claimed in claim 1, wherein the user commands are carried out via a manual input device.

3. The method as claimed in claim 2, wherein the manual input device is a joystick.

4. The method as claimed in claim 1, wherein the spatial shifting further comprises spatially shifting along a second axis direction, which is orthogonal to the first axis direction.

5. The method as claimed in claim 1, wherein the second 2D image is a 2D fluoroscopy image obtained with the second imaging device.

6. The method as claimed in claim 1, wherein the 3D image data set is recorded using the second imaging device to obtain an image selected from the group consisting of: a CT image, a 3D angiography image, and an MRT image.

7. A device for improving a 3D visualization of both a vascular insert and a vessel anatomy surrounding the insert in a patient using a radiography during a medical intervention procedure, comprising:

a fluoroscopy device for recording a first 2D image containing a view of the insert and the vessel anatomy surrounding the insert;

a memory for storing a 3D image data set, which includes a view of at least said vessel anatomy of the patient and which is recorded prior to the procedure;

a processing device for determining a 2D projection to obtain a second 2D image from the 3D image data set, the second 2D image containing a view of the vessel anatomy and congruent with the first 2D image and overlaying the first 2D image with the second 2D image, wherein the view of the insert in the first 2D image has a first-contrast value, wherein a view of the second 2D image has a second-contrast value, wherein the second-contrast value is sufficiently high relative to the first-contrast value to cover the view of the insert when the first and second 2D images are overlaid;

a monitor for displaying at least two images parts of the overlaid images on a single window display on the monitor, wherein at least one of said at least two image parts contains the view of the insert and the vessel anatomy surrounding the insert, wherein at least another one of said at least two image parts is transparent relative to said at least one of said at least two image parts;

a user-interface device to manually adjust a transparency stage of at least one of the overlaid images and provide a blended view of the vessel anatomy surrounding the insert but covering the view of the insert due to the second contrast value of the second 2D image being sufficiently high relative to the first contrast value of the insert in the first 2D image;

a cross-fading adjuster configured to adjust a cross fading of the two image parts of the overlaid images;

a spatial shifter configured to spatially shift within said single window display in response to commands from a user at least one of the two image parts of the overlaid images on said single window display along a first axis direction, wherein the spatial shifter is further configured to cause a sufficient spatial separation between said at least one of said at least two image parts containing the view of the insert, and said at least another one of said at least two image parts covering the view of the insert so that the view of the insert is no longer covered, said at least two image parts providing respective views of the vessel anatomy surrounding the insert; and a cursor generator configured to generate respective cursors linked to said at least two image parts, wherein the respective linked cursors are simultaneously displayed on said single window display, wherein relative movement of the respective cursors displayed on said single window display provided a visual cue to the user for performing said spatial shifting, wherein the respective cursors displayed on said single window display are configured to point to an identical position is selected by the user.

8. The device as claimed in claim 7, wherein the user commands are carried out via a manual input device.

9. The device as claimed in claim 8, wherein the manual input device is a joystick.

10. The device as claimed in claim 7, wherein the spatial shifter is further configured to spatially shift along a second axis direction, which is orthogonal to the first axis direction.

11. The device as claimed in claim 7, wherein the first 2D image is recorded intraoperatively.

* * * * *